United States Patent [19]

Blümle

[11] E Patent Number: Re. 32,128

[45] Reissued Date of Patent: Apr. 29, 1986

[54] TRANSPORT APPARATUS FOR TRANSPORTING FLEXIBLE SHEET-LIKE ARTICLES

[75] Inventor: Martin Blümle, Horhausen, Fed. Rep. of Germany

[73] Assignee: Winkler & Dunnebier Maschinenfabrik und Eisengiesserei GmbH & Co. KG, Fed. Rep. of Germany

[21] Appl. No.: 588,152

[22] Filed: Mar. 9, 1984

Related U.S. Patent Documents

Reissue of:

[64] Patent No.: 4,320,893
Issued: Mar. 23, 1982
Appl. No.: 159,844
Filed: Jun. 16, 1980

[30] Foreign Application Priority Data

Jun. 23, 1979 [CH] Switzerland ..... 5847/79

[51] Int. Cl.[4] ..... B65H 3/12

[52] U.S. Cl. ..... 271/94; 271/99; 271/106; 271/108

[58] Field of Search ..... 271/94, 96, 98, 99, 271/106, 108, 95

[56] References Cited

U.S. PATENT DOCUMENTS

| | | | |
|---|---|---|---|
| 2,033,849 | 3/1936 | Mudd | 271/94 |
| 2,796,258 | 6/1957 | Beck . | |
| 3,127,168 | 3/1964 | Kramer | 271/96 |
| 3,271,024 | 9/1966 | May | 271/94 |
| 4,145,040 | 3/1979 | Huber | 271/276 |
| 4,184,670 | 1/1980 | Rosendahl | 271/99 X |

FOREIGN PATENT DOCUMENTS

| | | |
|---|---|---|
| 2006566 | 12/1969 | France . |
| 53-48442 | 11/1978 | Japan . |
| 244402 | 1/1926 | United Kingdom . |
| 685810 | 1/1953 | United Kingdom . |
| 789681 | 1/1958 | United Kingdom . |
| 967491 | 8/1964 | United Kingdom . |
| 1287037 | 8/1972 | United Kingdom . |
| 1343235 | 5/1975 | United Kingdom . |

*Primary Examiner*—Richard A. Schacher
*Attorney, Agent, or Firm*—Wigman & Cohen

[57] ABSTRACT

There is disclosed transport apparatus for transporting flexible sheet-like articles, especially envelopes. The apparatus comprises a transport cylinder, which is mounted on a shaft rotatably journalled in a frame and which comprises two cylindrical body portions. The body portions are each provided with axial suction ducts with outlet openings communicating with the circumferential surfaces of the body portions. The body portions are provided at their mutually remote ends with bores into which project bushes, which are mounted to the frame to be secure against rotation. A suction device is connected in a certain rotational position of the cylinder, through passages which are provided in the bushes and open at the circumferential surfaces of the bushes, with the suction ducts of the cylinder body portions. In another rotational position of the cylinder, the suction ducts of the body portions are ventilated by the bushes. The apparatus is capable of high operating speeds with minimum noise production.

9 Claims, 3 Drawing Figures

TRANSPORT APPARATUS FOR TRANSPORTING FLEXIBLE SHEET-LIKE ARTICLES

Matter enclosed in heavy brackets [ ] appears in the original patent but forms no part of this reissue specification; matter printed in italics indicates the additions made by reissue.

BACKGROUND OF THE INVENTION

The present invention relates to transport apparatus for transporting flexible sheet-like articles, for example, sheets of paper, cards and envelopes.

Known machines for bundling letter or dispatch envelopes comprise intake equipment for inducting envelopes disposed in a stack. Such intake equipment includes a cylinder, which rotates in operation and which has suction openings for applying suction to successive envelopes, drawing individual envelopes from the base of the stack and, for example, transferring the envelopes to downstream transport equipment. At the point of each transfer, the suction openings are ventilated so that the envelope is released from the cylinder.

A known form of intake equipment has a cylinder with a shaft and two cylinder body portions, which are mounted on the shaft to be rotatable therewith and the circumferential surfaces of which incorporate a series of suction openings, which open into a suction channel extending along the rotational axis. The shaft is hollow and its interior connects the suction channels of the two cylinder body portions to a suction device via a control coupling. The control coupling comprises a first part fastened to a frame of the equipment to be non-rotatable relative thereto and a second part connected to the shaft to be rotatable therewith. The two parts have air passages with openings which, in a certain rotational position of the cylinder, face each other. In this rotational position, the cylinder applies suction to successive envelopes and entrains the envelopes in succession. The control coupling is also provided with a ventilation channel in order to ventilate the suction openings in another rotational position of the cylinder.

Present between the two cylinder body portions is a groove in which is arranged a separating device. The separating device is mounted on the frame to be non-rotatable relative thereto and is provided with a suction opening, which is located in the interior of the groove below the envelope stack. The suction opening of the separating device is connected via a duct with separate suction control couplings, which in turn are connected with the suction device. Each of these control couplings comprises a first part fastened to the frame to be non-rotatable relative thereto and a second part which is mounted on a separate shaft and which is rotated synchronously with the cylinder by a gear. This separate control coupling is constructed in such a manner that the suction opening of the separating device, in a particular rotational position of the cylinder, supplies suction to suck the lowermost envelope of the stack partially into the groove. Subsequently, this envelope is released by ventilation of the suction opening of the separating device so that it can be entrained by the cylinder. The separating device ensures that only one envelope is drawn away from the stack at a time.

In the known equipment, relatively long air paths are present between the two control couplings and the suction openings of the cylinder and separating device. In operation of the equipment, these air paths must be alternately partially evacuated and then ventilated. For this purpose, a relatively large quantity of air must be sucked away or let in. This entails the disadvantages that the maximum possible operating speed is relatively limited and a considerable amount of noise is generated. The noise is to a large extent caused by the substantial quantities of air which must be sucked away from or let into the air paths. In particular, ventilation generates noise like a report on the sudden inflow of air. Furthermore, the known intake equipment has the disadvantage that the control couplings require a considerable amount of space and thereby increase the overall size of the equipment.

Transport cylinders with suction openings are used not only for intake equipment, but also for other transport and deflection purposes. For example, in the specification of Swiss Patent Application No. 10847/78, there is described a cylinder, which serves to provide a deflector and which has a number of suction channels each provided with a plurality of suction openings opening at the circumferential surface of the cylinder. The suction channels open at one of the end faces of the cylinder. The cylinder is associated with a suction control coupling comprising a ring which is nonrotatably fastened to the frame and is co-axial with the cylinder. The end face of the ring facing the cylinder end face in which the suction channels open is provided with grooves extending along a circular arc and with a radial ventilation groove. In certain rotational positions of the cylinder, the suction channel openings in the end face of the cylinder communicated with the grooves in the ring of the control coupling, so that air is either sucked out of the suction channels or else the suction channels are ventilated.

This deflector is also only capable of operation at relatively low speeds. The grooves in the stationary ring of the control coupling and the openings of the suction channels at the end face of the cylinder extend for only a relatively short distance in radial direction because only a small space is available between the shaft and the outer rim of the cylinder. Accordingly, the flow cross-sectional area for air transition from the stationary ring of the control coupling to the cylinder is relatively small, with the result that the operating speed of the deflector is correspondingly limited to a relatively low value. This is particularly so because at least a part of the air in the cylinder itself must traverse a relatively long path due to the fact that all the air is sucked away or flows in at one end face of the cylinder and thus in part must flow through almost the entire length of the cylinder.

SUMMARY OF THE PRESENT INVENTION

The invention has as its object the provision of transport apparatus for transporting sheets of paper, cards, letter or dispatch envelopes and other such flexible sheet-like articles with the maximum possible operating speed and with minimum generation of noise.

In accordance with one aspect of the present invention, there is provided transport apparatus for transporting flexible sheet-like articles, comprising a frame in which is mounted a transport cylinder to be rotatable about an axis. The cylinder comprises a cylindrical inner surface defining a bore co-axial with said axis and means defining at least one suction transfer duct, a first passage extending through said cylindrical inner surface and connecting said bore to said at least one duct, and at least one second passage connected to said at least one duct and opening at the circumference of the cylinder for supplying suction to attract individual such articles to said circumference for transport by the cylinder. Drive means are provided to rotate the cylinder about said axis and a suction device for providing suction. A connecting means serves to alternately connect said at least one duct to the suction device in one rotational orientation of the cylinder and to ventilate said at least one duct in another rotational orientation of the cylinder. The connecting means comprises a body which is mounted to the frame to be secure against rotation and which projects into said bore. The body comprises a cylindrical outer surface disposed so as to face said cylindrical inner surface of the cylinder and means which define suction transfer passage means connected to the suction device and opening at said cylindrical outer surface so as to be connected to said at least one duct via said first passage in said one rotational orientation of the cylinder.

In another aspect of the invention there is provided transport apparatus for transporting flexible sheet-like articles, the apparatus similarly comprising a frame in which a transport cylinder is mounted to be rotatable about an axis. The cylinder comprises means defining at least two suction transfer ducts, passage means connected to said ducts and opening at the circumference of the cylinder for supplying suction to attract individual such articles to said circumference for transport by said cylinder, and a groove extending circumferentially of said cylinder and between said ducts, the base of said groove being in the form of an annular surface which is co-axial with said axis and which includes a recess. A suction device is present for providing suction and transfer means are provided for drawing individual such articles partly into said groove in a predetermined rotational orientation of said cylinder to facilitate transfer of the articles thereto. The transfer means comprises a member which is mounted on the frame to be secure against rotation and which projects into said groove. The member comprises an inner surface facing said annular surface and extending concentrically therewith, and means defining a first passage connected to the suction device and opening at said inner surface of the member and a second passage, which extends between and opens at said inner surface of the member and an outer surface of the member in said groove and which is connected to said first passage by said recess when the cylinder is in said predetermined rotational orientation for supplying suction to attract individual ones of the articles to said outer surface.

BRIEF DESCRIPTION OF THE DRAWINGS

An embodiment of the present invention will now be more particularly described by way of example with reference to the accompanying drawings in which.

DESCRIPTION OF THE PREFERRED EMBODIMENT

Figure 1:
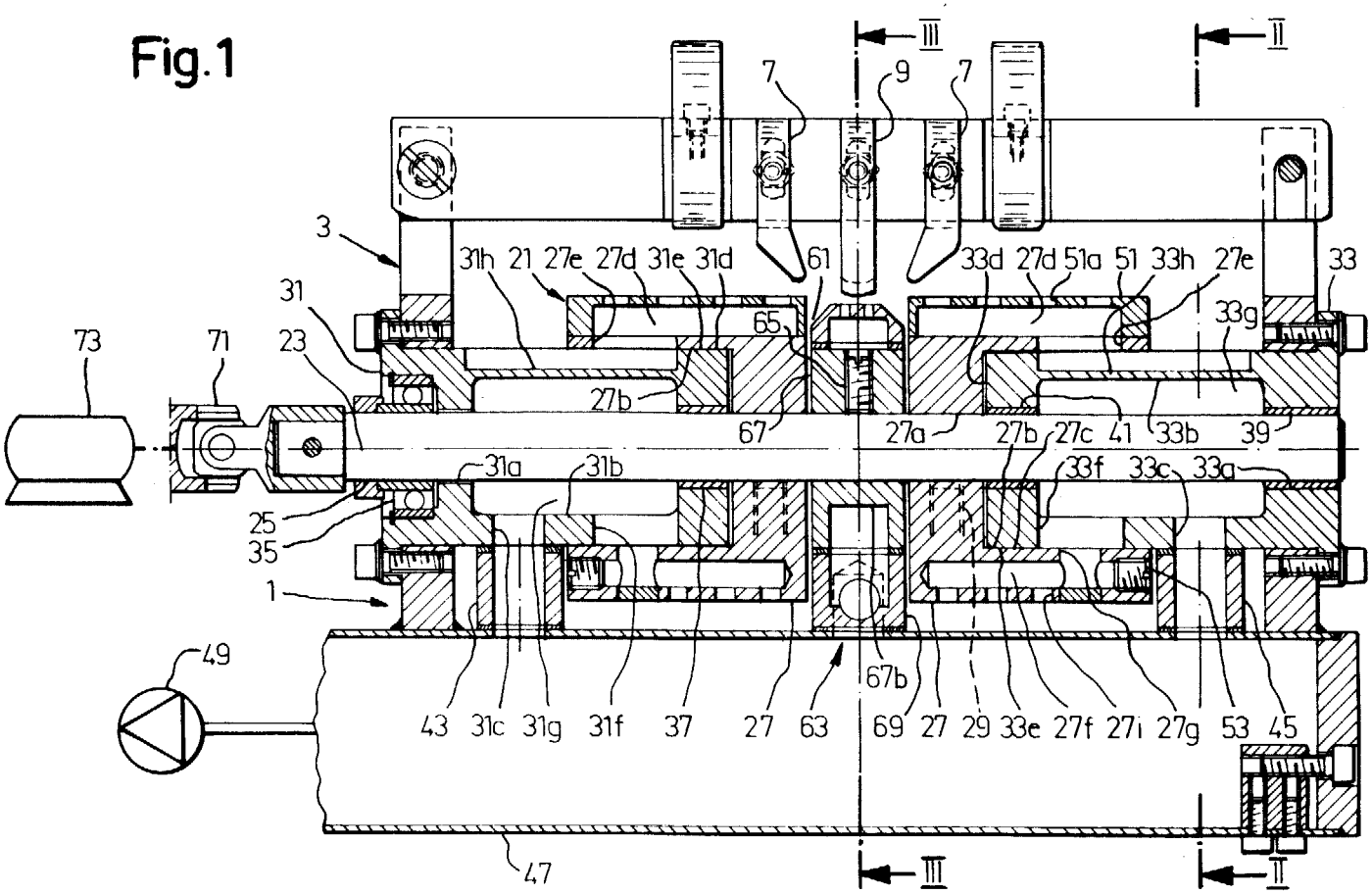
FIG. 1 is a longitudinal sectional view of transport apparatus according to the said embodiment, the view being taken along the axis of a cylinder of the apparatus with parts of the apparatus being drawn displaced relative to each other to improve clarity.

Referring now to the drawings, there is shown transport apparatus which can, for example, form a part of a machine for bundling letter or dispatch envelopes. The apparatus comprises a frame 1 which is fastened to a frame of the machine or is formed by parts of the latter frame. Fastened to the frame 1 is a stack holder 3, which amongst other things comprises an inclined support 5 and strippers 7 and 9 and holds a stack of envelopes 11.

A cylinder, indicated generally by 21, is mounted in the frame 1 to be rotatable about a horizontal axis 23. The cylinder 21 comprises a shaft 25 on which are mounted two substantially cylindrical body portions 27 each having a continuous through bore 27a co-axial with the axis 23. The body portions 27 are mounted on the shaft, to be rotatable therewith, by means of screws 29, shown only in part (FIG. 1). The bores 27a each include a section of 27b of a greater diameter than that of the shaft 25. These sections 27b are externally bounded by cylindrical inner surfaces 27c and are open at the mutually remote ends of the two body portions 27.

Two bushes 31 and 33 are arranged at the two ends, respectively, of the shaft 25. The bushes are provided at their mutually remote ends with flanges and are connected by screws to the frame 1 to be secure against rotation. The bushes 31 and 33 have continuous through bores 31a and 33a, respectively, co-axial with the axis 23. The bore 31a is provided at the lefthand end of the respective bush with an enlargement, in which a ballbearing 35 is located. To the right of this, the bore 31a has a section of reduced diameter, the diameter of this section being slightly greater than the diameter of the shaft so that the shaft can rotate freely but is to some extent sealed off at this point. Immediately to the right of the reduced diameter section is an enlargement which, together with the shaft 25, defines an annular chamber 31b. The righthand end of the bore 31a again has a section of reduced diameter in which is located a bearing ring 37, which serves for the journalling of the shaft 25 and which at the same time seals off the chamber 31b to some extent at the righthand end of the bush 31.

The bush 33 is by and large constructed identically to the bush 31 and its bore 33a also has, in the interior part of the bush, an enlargement which together with the shaft 25 defines a chamber 33b, the chamber being sealed off outwardly to some extent. The only difference between the two bushes 31 and 33 is that at its outer end the bush 33 is provided with a bearing ring 39 rather than a ballbearing for the journalling of the shaft. At the inner end of the bush opening 33a, a bearing ring 41 is present as in the case of the bush 31.

The chambers 31b and 33b are connected by radial openings 31c and 33c, respectively, and by stub pipes 43 and 45, respectively, with the interior of a suction duct 47. The duct 47 in turn is connected with a suction device 49, which comprises a pump and preferably also a storage means.

The two bushes 31 and 33 have portions 31d and 33d, respectively, which face each other and which project into the bore sections 27b of the cylinder body portions 27. A sufficient amount of play is present between cylindrical outer surfaces 31e and 33e of, respectively, the portions 31d and 33d and the inner surfaces 27c of the body portions 27 to on the one hand permit body portions to rotate with minimal friction and on the other hand to close off the bore sections 27b relatively tightly.

The two body portions 27 each have a respective suction channel 27d, which extends parallel to the axis 23 and is bounded by milled recess and by a cover element 51 secured in place by screws. The cover element 51 is provided with a series of suction openings 51a which extend in the direction of the axis 23 and communicate with the atmosphere. Each channel 27d is connected with a radial passage 27e, which opens at the inner surface 27c. In addition, three further suction channels 27f, extending parallel to the axis 23, are provided in each body portion 27, each of the channels 27f being formed by a blind bore tightly closed at its open end by a screw 53. A series of suction openings 27i extend from each of the channels 27f to the circumferential surface of the respective body portion 27, and, each of the channels 27f is connected with a radial passage 27g, which opens at the inner surface 27c.

The portions 31d and 33d of the bushes 31 and 33 are each provided with a radial passage 31f or 33f. Each of these passages 31f and 33f extends over a circular sector of about 130° with respect to the axis 23, as can be seen from the boundary lines of the opening 33f drawn in dashed lines in FIG. 2. The passages 31f and 33f extend from the chambers 31b and 33b, respectively, to the outer surfaces 31e and 33e, respectively, so that in certain rotational positions of the cylinder they connect the channels 27d and 27f thereof with the chambers 31b and 33b. Each of the two bushes 31 and 33 thus comprises a passage means which is designated as an entity by 31g or 33g, is tightly closed off outwardly to some extent, and which in certain rotational positions of the cylinder connects the suction channels 27d of the cylinder body portions with the suction device 49.

The bush portions 31d and 33d are also provided at their circumferential surfaces 31e and 33e with ventilation channels 31h and 33h, respectively, which extend parallel to the axis 23 and which are each disposed partly within and partly externally of the respective body portion 27. In a certain rotational position of the cylinder, the ventilation channels 31h and 33h overlap the radial passages 27e leading to the suction channels 27d of the body portions 27.

Figure 2:
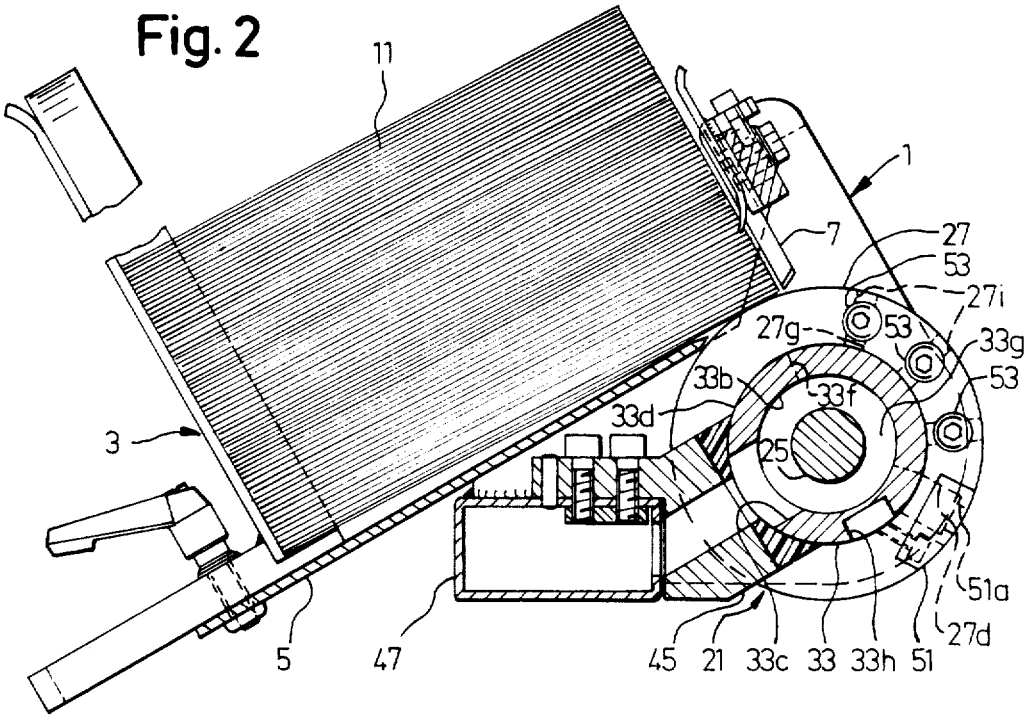
FIG. 2 is a cross-section along the line II—II of FIG. 1, with the cylinder drawn in another rotational position.

At this juncture, it is again pointed out that the bushes 31 and 33 and the body portions 27 in FIG. 1 are partially sectioned along planes which do not extend vertically, as a comparison with FIG. 2 will show. In addition, the illustrated position of the stub pipes 43 and 45 in FIG. 1 does not correspond to a vertical section.

A groove 61 is provided between the two cylinder body portions 27. Arranged in the groove 61 is a separating device, indicated generally by 63, comprising a ring 67 connected to the shaft 25 by means of a screw 65 to be rotatable with the shaft. The ring 67 is provided with a recess 67b in its circumferential surface 67a, this surface being co-axial with the axis 23. The separating device [61] *63* further comprises a body 69 which is rigidly fastened to the frame 1 and which is of generally C-shaped cross-section. The body 69 extends around about half the circumference of the ring 67 and has an inner surface 69a which is concentric with the axis 23 and which is provided with transition means extending closely adjacent to the surface 67a. The body 69 is provided with passage 69b, which extends from the suction duct 47 to an opening 69c at the inner surface 69a. The body 69 is also provided with an approximately radially extending passage 69d, which comprises a relatively wide opening at the inner surface 69a and a plurality of narrow openings at an outer surface portion of the body 69. This outer surface portion is disposed just inside the groove 61, in the proximity of the upper rim of the lowermost one of the envelopes 11. In a certain rotational position of the cylinder 21, the recess 67b connects the opening 69c with the passage 69d.

The shaft 25 is connected through an articulated coupling 71 and transmission means (not shown) with a drive motor 73.

Figure 3:
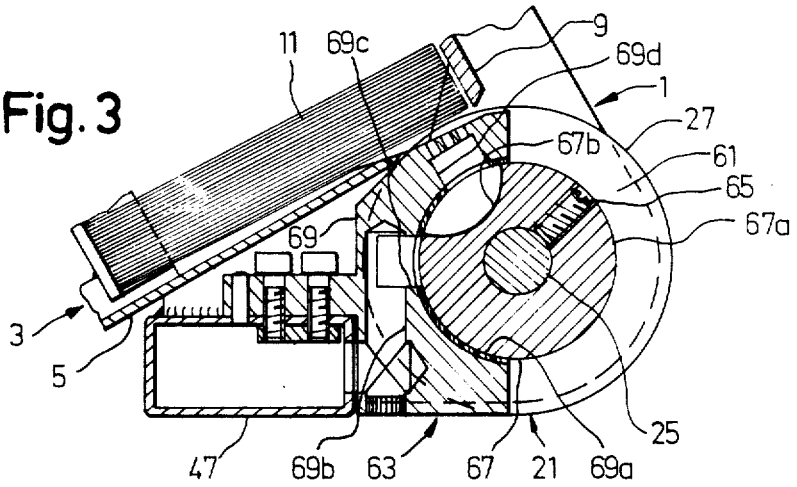
FIG. 3 is a cross-section along the line III—III of FIG. 1.

In operation of the transport apparatus hereinbefore described, the drive motor 73 drives the cylinder 21 so that it rotates in a clockwise direction with respect to FIGS. 2 and 3. Air is constantly sucked away by the suction device 49 so that an underpressure is always present in the duct 47 and in the passages 31g and 33g of the bushes 31 and 33. In addition, an underpressure is of course constantly present in the passages 69b of the body 69 of the separating device.

During each revolution of the cylinder 21, the ring 67 of the separating device 63 is positioned so that the recess 67b connects the passage 69b with the passage 69d. As a result, the lowermost envelope of the stack is slightly deformed and a portion thereof is sucked into the groove 61. The lowermost envelope is thus separated at one edge thereof from the remaining envelopes. Approximately at that moment, the mutually aligned suction channels 27d of the two cylinder body portions 27 are connected by the passages 27e with the passage 31g and 33g so that suction is supplied through the opening 51a to suck the lowermost envelope away from the stack, while the remaining envelopes in the stack are held back by the strippers 7 and 9. Shortly after the start of this process, the recess 67b reaches a position in which it connects the passage 69d with the atmosphere and ventilates this passage.

The cylinder 21 then transports the lowermost envelope away from the stack through a certain rotational angle, the envelope being additionally attracted to the cylinder by suction supplied from successive suction openings 27i of the suction channels 27f.

When the passages 27e are aligned with the ventilation channels 31h and 33h, the suction channels 27d are ventilated. Subsequently, the suction channels 27f are ventilated in succession. The envelope can then detach from the cylinder and be taken over by another transport or processing device (not shown) of the machine.

The two bushes 31 and 33 thus each form a stator of a suction control coupling, the rotor of which is formed by a respective one of the cylinder body portions 27. During ventilation of the suction channels 27d and 27f, air is supplied to relieve just these channels while the passages 31g and 33g of the bushes 31 or 33 remain subject to underpressure. During the transition from ventilating to sucking and vice versa, only relatively small quantities of air have to be sucked away or let in. Moreover, each of the passages 27e can connect the respective suction channel 27*d* with the associated passage 31g or 33g over a relatively large part of the length of the channel measured along the axis 23.

In the separating device 63, the body 69 forms the stator and the ring 67 the rotor of a suction control coupling. On changing from suction to ventilation and vice versa, again only relatively small quantities of air have to be let in or sucked away.

The apparatus can therefore operate at high speed, for example, it may be readily possible to draw about 100 envelopes per minute from the stack into the machine for further processing. In operating at that speed, the apparatus generates a relatively small amount of noise.

The apparatus illustrated in the drawings serves to induct letter or dispatch envelopes. It is, of course feasible to adapt the apparatus to induct postcards consisting of thin flexible cardboard.

Moreover, the apparatus can not only be employed for the intake of envelopes or cards, but can also be used at other points in a machine at which paper sheets, cards, letter or dispatch envelopes and the like, have to be transported.

I claim:

1. Transport apparatus for transporting flexible sheet-like articles, comprising:

a frame;

a transport cylinder which is mounted on said frame to be rotatable about an axis and which includes means for defining at least two suction transfer ducts, passage means, connected to said ducts and opening at the circumference of said cylinder, for supplying suction to attract individual such articles to said circumference for transport by said cylinder, and a groove means for extending circumferentially of said cylinder and between said ducts, the base of said groove means being in the form of an annular surface which is co-axial with said axis and which includes a recess;

a suction means for providing suction; and transfer means for drawing individual such articles partly into said groove means in a predetermined rotational orientation of said cylinder to facilitate transfer of the articles thereto, said transfer means including a member which is mounted on said frame to be secure against rotation and which projects into said groove means, said member including an inner surface facing said annular surface and extending concentrically therewith and further including means for defining a first passage connected to said suction means and opening at said inner surface of said member and a second passage which extends between and opens at said inner surface of said member and an outer surface of said member in said groove means and which second passage is connected to said first passage by said recess when the cylinder is in said predetermined rotational orientation for supplying suction to attract said individual articles to said outer surface.

2. Transport apparatus according to claim 1, wherein a portion of said outer surface, completely surrounding said opening of said second passage, is viewed in a projection along the axis of the cylinder, inside the cylindrical surfaces into which the suction openings open.

3. Transport apparatus according to claim 1 further comprising:

drive means for rotating said transport cylinder about said axis.

[4. Transport apparatus according to claim 1, wherein said member further comprises means for defining a ventilation channel which is arranged to extend in part into said groove means so as to be connected to said at least two suction transfer ducts via said first passage in another rotational orientation of said cylinder.]

[5. Transport apparatus according to claim 1, wherein:

said transport cylinder comprises a further such cylindrical inner surface portion defining a further such groove means and means for defining a further such suction transfer duct, and said transfer means comprises a further such member projecting into said further groove means for alternately connecting said further suction transfer duct to said suction means in said one rotational orientation of said cylinder and ventilating said further suction transfer duct in said other rotational orientation of the cylinder.]

6. Transport apparatus according to claim [5] 7, comprising a shaft which is rotatably journalled in said [members] *bushes* of said [transfer] *connecting* means, said transport cylinder being mounted on said shaft to be rotatable therewith.

*7. Transport apparatus according to claim 1, wherein said cylinder is provided with two axial bores, each bore being connected with a respective one of said at least two transfer ducts, connecting means for alternately connecting said at least two ducts to said suction means and for ventilating the ducts in respective ones of two rotational orientations of the cylinder, said connecting means comprising bushes mounted to said frame to be secure against rotation, said bushes projecting into said axial bores and being provided with suction transfer passages connected to said suction means, said suction transfer passages being connected to said ducts in a respective one of said two rotational orientations of the cylinder.*

*8. Transport apparatus according to claim 7, wherein said bushes each comprise a cylindrical outer surface confronting a cylindrical inner surface portion of a respective one of said two axial bores of the cylinder, said suction transfer passages and said suction transfer ducts being connected in said respective one rotational orientation by aligned openings in said cylindrical outer and inner surfaces.*

*9. Transport apparatus according to claim 8, wherein said bushes are each provided with a ventilation channel in said cylindrical outer surfaces, each ventilation channel partly extending into a respective bore and being connected to a respective suction transfer duct in the other of said two rotational orientations of said cylinder.*

*10. Transport apparatus according to claim 7, wherein said axial bores open into opposite ends of said cylinder.*

*11. Transport apparatus according to claim 1, wherein the end of said second passage which opens at said inner surface of said member is formed by a single opening and the other end of said second passage which opens at said outer surface of said member is formed by a plurality of narrow openings.*

* * * * *